Feb. 27, 1968

E. SHAY 3,370,771

METHOD AND APPARATUS FOR POSITIONING STRIP
IN A CONTINUOUS STRIP PROCESSING LINE
FOR WELDING TO PRECEDING STRIP

Filed Feb. 26, 1964

INVENTOR
Eli Shay

By Hooper, Leonard & Buell
his attorneys

United States Patent Office 3,370,771
Patented Feb. 27, 1968

3,370,771
METHOD AND APPARATUS FOR POSITIONING STRIP IN A CONTINUOUS STRIP PROCESSING LINE FOR WELDING TO PRECEDING STRIP
Eli Shay, Warren, Ohio, assignor to Wean Industries, Inc., a corporation of Ohio
Filed Feb. 26, 1964, Ser. No. 347,488
20 Claims. (Cl. 228—8)

ABSTRACT OF THE DISCLOSURE

A method and apparatus for positioning the leading end of a strip in a continuous strip processing line with a predetermined longitudinal element spaced inwardly of the strip from an edge thereof, such as the longitudinal center line of the strip, in longitudinal alignment with the corresponding longitudinal element of the trailing end of the preceding strip for welding the leading end of the following strip to the trailing end of the preceding strip. The positioning is accomplished by sensing the transverse location of the longitudinal element of the trailing end of the preceding strip and transversely shifting the leading end of the following strip in accordance with the sensed transverse location of said longitudinal element of the preceding strip to position the leading end of the following strip with said longitudinal element thereof in longitudinal alignment with the corresponding longitudinal element of the trailing end of the preceding strip. Preferably the positions of both edges of the trailing end of the preceding strip are sensed and means are provided actuated by such sensing for transversely shifting the leading end of the following strip. By such method strips of unequal widths can be relatively centered for welding together.

This invention relates to a method and apparatus for positioning the leading end of a strip in a continuous strip processing line with a predetermined longitudinal element thereof in longitudinal alignment with the corresponding longitudinal element of the trailing end of the preceding strip for welding the leading end of the first mentioned strip to the trailing end of the preceding strip. In one embodiment the invention provides for positioning the leading end of a strip in a continuous strip processing line with its longitudinal center line in longitudinal alignment with the longtudinal center line of the trailing end of the preceding strip, although, as when the continuous strip processing line is a slitting line, the strips may be relatively disposed with another longitudinal element such as a side edge in longitudinal alignment.

The purpose of the invention is to insure welding adjacent strip ends to each other in proper alignment to eliminate conditions called "dog leg" and "offset" which cause troublesome tracking problems and strip breakage.

My apparatus insures longitudinal alignment of strips whose ends are to be welded together with a predetermined longitudinal element of the respective strips in longitudinal alignment. For purposes of explanation and illustration the invention will be described in connection with a method and apparatus for positioning the leading end of a strip in a continuous strip processing line with its longitudinal center line in longitudinal alignment with the longitudinal center line of the trailing end of the preceding strip for welding the leading end of the first mentioned strip to the trailing end of the preceding strip. My method and apparatus are relatively simple and foolproof and utilize existing and easily procurable components.

I provide for sensing the transverse location of a predetermined longitudinal element of the trailing end of a preceding strip and transversely shifting the leading end of the following strip in accordance with the sensed transverse location of said longitudinal element of the preceding strip to position the leading end of the following strip with the corresponding longitudinal element thereof in longitudinal alignment with said longitudinal element of the trailing end of the preceding strip. Such sensing is preferably accomplished while the preceding strip is advancing in the continuous strip processing line. By such sensing I provide for creating a signal reflecting transverse movement of the preceding strip. I then transversely shift the leading end of the following strip in accordance with the signal thus created to position the leading end of the following strip with said longitudinal element thereof in longitudinal alignment with the corresponding longitudinal element of the trailing end of the preceding strip. I provide transverse positioning means for the leading end of the following strip and transversely shift such means in accordance with the sensed transverse location of the longitudinal element of the preceding strip.

By the sensing above referred to I preferably create an electric current flow reflecting transverse movement of the preceding strip with the direction of current flow correlated to the direction of transverse movement of the preceding strip and by said electric current flow transversely shift the leading end of the following strip in one or the other transverse direction depending upon the direction of current flow.

I preferably by a sensing device sense the transverse location of the longitudinal element of the trailing end of the preceding strip while the preceding strip is advancing in the continuous strip processing line, by such sensing create a first signal reflecting transverse movement of the preceding strip, provide transverse positioning means for the leading end of the following strip, by the first signal transversely shift the sensing device in accordance with the transverse movement of the preceding strip, by the transverse shifting of the sensing device create a second signal reflecting such transverse shifting of the sensing device and by the second signal transversely shift the transverse positioning means in accordance with the transverse shifting of the sensing device.

My shifting means may include an electro-hydraulic controller, preferably coupled with a hydraulic cylinder actuated thereby. The sensing means or device preferably includes sensing elements disposed relatively at the side edges of the trailing end of the preceding strip, and means are preferably provided for transversely shifting the sensing elements toward and away from each other in accordance with changes in width of the trailing end of the preceding strip.

Other details, objects and advantages of the invention will become apparent as to the following description of a present preferred embodiment thereof and a present preferred method of practicing the same proceeds.

In the accompanying drawings I have shown a present preferred embodiment of the invention and have illustrated a present preferred method of practicing the same in which.

Figure 1:
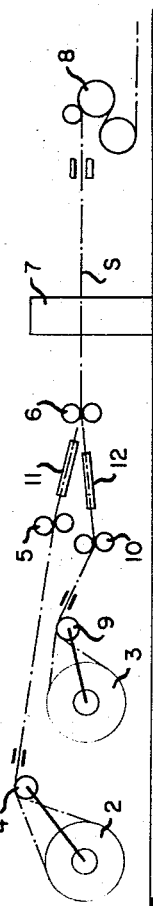
FIGURE 1 is a diagram of a portion of a continuous strip processing line illustrating my invention.

Referring now more particularly to the drawings, FIGURE 1 shows diagrammatically the entry end of a continuous strip line including a welder for welding the leading end of each strip to the trailing end of the preceding strip. As is known to those skilled in the art, when the trailing end of a strip reaches the welder it is sheared off and the leading end of the following strip is sheared off and abutted against the trailing end of the preceding strip and the abutted ends of the strips are welded together. During the welding a strip is drawn from a supply of strip in a looper in advance of the welder so that the operation of the line is continuous. This is conventional practice.

In FIGURE 1 there is shown a coil 2 of strip on a first uncoiler and a coil 3 of strip on a second uncoiler. The strip from the coil 2 passes over a guide roll 4 and between guide rolls 5 and 6 to the welder 7. From the welder 7 the strip, here designated S, passes through a bridle 8 to the looper and thence through the line in conventional manner. The strip from the coil 3 passes over a guide roll 9 and between guide rolls 10 and 6 to the welder 7.

Side guides 11 are provided for side guiding the strip 2 and side guides 12 are provided for side guiding the strip 3. Shearing means for shearing the leading end of the strip 2 are provided between the rolls 5 and the side guides 11 and shearing means for shearing the leading end of the strip 3 are provided between the rolls 10 and the side guides 12. The welder 7 is provided with shearing means for shearing the trailing end of each strip as is conventional in the art.

The purpose of the side guides 11 and 12 is to position the leading end of each strip with a predetermined longitudinal element thereof in longitudinal alignment with the corresponding longitudinal element of the trailing end of the preceding strip for welding the leading end of the first mentioned or following strip to the trailing end of the preceding strip. A tracking assembly designated generally by reference numeral 13 is shown in FIGURE 2 for laterally tracking the trailing end of the strip S passing from the welder and means now to be described are controlled by the tracking assembly for insuring that the leading end of the following strip is positioned with a predetermined longitudinal element thereof in longitudinal alignment with the corresponding longitudinal element of the trailing end of the preceding strip for welding the leading end of the following strip to the trailing end of the preceding strip at the welder.

Figure 2:
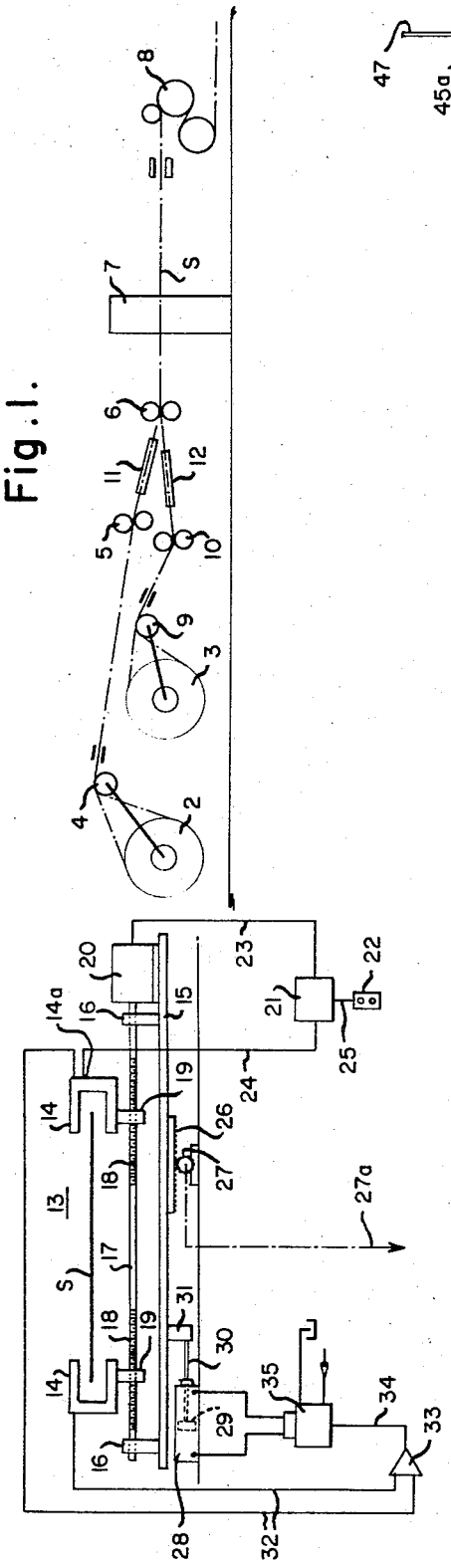
FIGURE 2 is a diagram of the strip position tracking transmitter.

The tracking assembly includes sensors 14, which may be of conventional construction, disposed respectively at the side edges of the strip as shown in FIGURE 2. It will be understood that reference character S is applied to the strip fed to the line from the welder and which in normal practice is constituted alternately by strips from the respective first and second uncoilers.

A support 15 extends transversely of the strip S below the strip and has bearings 16 rotatably supporting a shaft 17 having on opposite sides of its center threads 18 of opposite hand in threaded engagement with brackets 19 carrying the sensors 14 so that rotation of the shaft 17 causes the sensors 14 to move equally toward or away from each other depending upon the direction of rotation of the shaft 17. Means (not shown) are provided for holding the sensors against turning with the shaft 17. A gear motor 20 is mounted on the support 15 for rotating the shaft 17. The gear motor is operated by a width change controller 21 which may be of conventional construction and which may automatically drive the gear motor in one direction or the other to move the sensors 14 toward or away from each other so that the effective distance apart of the sensors is at all times equal to the width of the strip. Also the gear motor may be manually operated through the width change controller by a manual width change push button switch 22. Electrical connections 23 between the gear motor 20 and the width change controller 21, electrical connections 24 between the width change controller 21 and a sensor 14a behind the right hand sensor 14, viewing FIGURE 2 and hence concealed thereby, and electrical connections 25 between the width change controller 21 and the manual width change push button switch 22 are shown diagrammatically and may be conventional. The sensor 14a is an independent sensor for automatic operation of the gear motor 20.

The support 15 is mounted for transverse movement and has on its bottom a rack 26 in mesh with a pinion 27 of a position transmitter which per se may be conventional. A cylinder 28 is stationarily mounted and a piston 29 operates in the cylinder 28 by hydraulic fluid under pressure, a piston rod 30 being connected with a bracket 31 carried by the support 15 so that movement of the piston 29 in the cylinder 28 causes corresponding transverse movement of the support 15 and the mechanism carried thereby.

The sensors 14 are electrically connected through connections 32 with a centerguide amplifier 33 which in turn is electrically connected through connections 34 with an electro-hydraulic controller such, for example, as an Askania regulator 35 which controls the flow of hydraulic fluid to the respective ends of the cylinder 28.

Figure 3:
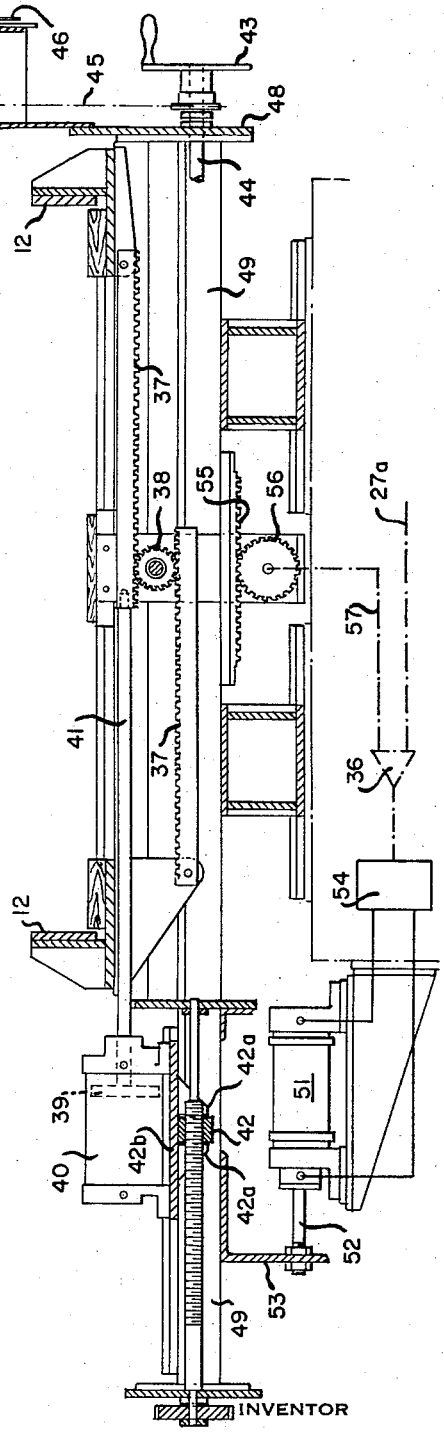
FIGURE 3 is a transverse cross-sectional view through a portion of my apparatus showing the side guides and the operating means therefor.

Initially the sensors 14 are set at a distance apart corresponding with the width of the strip S. If the width of the strip S is constant the distance apart of the sensors 14 remains constant. If the strip width varies the distance apart of the sensors is automatically adjusted to conform to the strip width. Each of the sensors 14 detects one edge of the strip and sends a signal to the centerguide amplifier 33. The so-called error signal from the centerguide amplifier 33 is applied to the electro-hydraulic controller 35 which controls the flow of hydraulic fluid to the cylinder 28 to move the piston 29 to cause the sensors 14 to follow transverse movement of the strip. The position of the tracking assembly is transmitted by the position transmitter through a conductor 27a to a position amplifier 36 shown in FIGURE 3.

The side guides 12 are carried respectively by transversely movable racks 37 both in mesh with a pinion 38. One of the tracks 37 (the upper one viewing FIGURE 3) is moved transversely by a piston 39 in a cylinder 40, the piston being connected with the rack by a piston rod 41. Thus the piston 39 causes at all times equal movement of the side guides 12 toward or away from each other depending upon the direction of movement of the piston.

A guide width adjusting nut 42 is transversely adjustable by means of a screw turned by a handwheel 43. By means of the handwheel 43 the adjusting nut 42 is predeterminedly positioned. The adjusting nut 42 is disposed between lugs 42a carried by a slide 42b upon which is mounted a cylinder 40 in which operates a piston 39. The position of the nut 42 determines the position of the slide 42b and the cylinder 40 mounted thereon. The piston 39 is as above stated connected with the upper rack 37 viewing FIGURE 3 by the piston rod 41. Movement of the piston to the right hand end of the cylinder 40 viewing FIGURE 3 predeterminedly relatively positions the racks 37 and hence the side guides 12. Piston 39 in the cylinder 40 is operated to press one of the side guides 12. In this way the side guides 12 are positioned a desired distance apart to guide the strip S. The screw shaft for adjusting the nut 42 is designated 44 and is connected by a sprocket chain 45 through a gear reducer 45a with a pointer 46 operating against a dial 47 showing the distance between the side guides 12.

The side guides 12 and the adjustable nut 42 and the operating mechanism therefor are carried through brackets 48 on a support 49 mounted for movement transversely of the strip 3. The support 49 is moved transversely by a piston in a cylinder 51, the piston rod 52 being connected with a bracket 53 integral with the support 49. The output from the position amplifier 36 is applied to an electro-hydraulic controller 54 which controls the flow of hydraulic fluid to the cylinder 51. A rack 55 is connected to the support 49 and meshes with a pinion 56 of a position transmitter having a feedback connection 57 with the position amplifier 36. When the two electrical signals to the position amplifier 36 are equal the side guides 12 remain in position but when one of such signals exceeds the other in magnitude the error signal through the electro-hydraulic controller 54 causes movement of the support 49 transversely corresponding to the transverse movement of the support 15 which causes the side guides to be positioned consonantly with the position of the strip S so that the longitudinal center line of the strip 3 will be in longitudinal alignment with the longitudinal center line of the strip S.

When the trailing end of the strip S reaches the welder it is sheared and clamped and the leading end of the strip 3 is sheared and advanced to the welder guided by the side guides 12 which as above explained have been automatically positioned to insure alignment of the longitudinal center line of the strip 3 with the longitudinal center line of the strip S. The leading end of the strip 3 is butted against the trailing end of the strip S and clamped and the strip ends are welded together and trimmed in conventional manner. The continuous operation of the line proceeds in normal fashion.

The strip 2 is next to be welded to the trailing end of the strip S. The positioning of the strip 2 is effected by the side guides 11 which are mounted, operated and controlled in the same manner as above described with respect to the side guides 12 for the strip 3. The tracking assembly 13 operates the respective sets of side guides 11 and 12 each at the proper time. The circuitry is such that by throwing a switch the tracking assembly can operate either the side guides 11 or the side guides 12, depending upon whether the strip 2 or the strip 3 is to be guided.

While I have shown and described a present preferred embodiment of the invention and a present preferred method of practicing the same it is to be distinctly understood that the invention is not limited thereto but may be otherwise variously embodied and practiced within the scope of the following claims.

I claim:

1. A method of positioning the leading end of a strip in a continuous strip processing line with a predetermined longitudinal element spaced inwardly of the strip from an edge thereof in longitudinal alignment with the corresponding longitudinal element of the trailing end of the preceding strip for welding the leading end of the first mentioned strip to the trailing end of the preceding strip, comprising sensing the transverse location of said longitudinal element of the trailing end of the preceding strip and transversely shifting the leading end of the first mentioned strip in accordance with the sensed transverse location of said longitudinal element of the preceding strip to position the leading end of the first mentioned strip with said longitudinal element thereof in longitudinal alignment with the corresponding longitudinal element of the trailing end of the preceding strip.

2. A method of positioning the leading end of a strip in a continuous strip processing line with a predetermined longitudinal element spaced inwardly of the strip from an edge thereof in longitudinal alignment with the corresponding longitudinal element of the trailing end of the preceding strip for welding the leading end of the first mentioned strip to the trailing end of the preceding strip, comprising sensing the transverse location of said longitudinal element of the trailing end of the preceding strip while the preceding strip is advancing in the continuous strip processing line, by such sensing creating a signal reflecting transverse movement of the preceding strip and transversely shifting the leading end of the first mentioned strip in accordance with said signal to position the leading end of the first mentioned strip with said longitudinal element thereof in longitudinal alignment with the corresponding longitudinal element of the trailing end of the preceding strip.

3. A method of positioning the leading end of a strip in a continuous strip processing line with a predetermined longitudinal element spaced inwardly of the strip from an edge thereof in longitudinal alignment with the corresponding longitudinal element of the trailing end of the preceding strip for welding the leading end of the first mentioned strip to the trailing end of the preceding strip, comprising sensing the transverse location of said longitudinal element of the trailing end of the preceding strip, providing transverse positioning means for the leading end of the first mentioned strip and transversely shifting the transverse positioning means in accordance with the sensed transverse location of said longitudinal element of the preceding strip to position the leading end of the first mentioned strip with said longitudinal element thereof in longitudinal alignment with the corresponding longitudinal element of the trailing end of the preceding strip.

4. A method of positioning the leading end of a strip in a continuous strip processing line with a predetermined longitudinal element spaced inwardly of the strip from an edge thereof in longitudinal alignment with the corresponding longitudinal element of the trailing end of the preceding strip for welding the leading end of the first mentioned strip to the trailing end of the preceding strip, comprising sensing the transverse location of said longitudinal element of the trailing end of the preceding strip while the preceding strip is advancing in the continuous strip processing line, by such sensing creating a signal reflecting transverse movement of the preceding strip, providing transverse positioning means for the leading end of the first mentioned strip, transversely shifting the transverse positioning means and by said signal controlling the transverse shifting of the transverse positioning means in accordance with the sensed transverse location of said longitudinal element of the preceding strip to position the leading end of the first mentioned strip with said predetermined longitudinal element thereof in longitudinal alignment with the corresponding longitudinal element of the trailing end of the preceding strip.

5. A method of positioning the leading end of a strip in a continuous strip processing line with a predetermined longitudinal element thereof in longitudinal alignment with the corresponding longitudinal element of the trailing end of the preceding strip for welding the leading end of the first mentioned strip to the trailing end of the preceding strip, comprising sensing the transverse location of said longitudinal element of the trailing end of the preceding strip while the preceding strip is advancing in the continuous strip processing line, by such sensing creating an electric current flow reflecting transverse movement of the preceding strip with the direction of current flow correlated to the direction of transverse movement of the preceding strip and by said electric current flow transversely shifting the leading end of the first mentioned strip in one or the other transverse direction depending upon the direction of current flow in accordance with the sensed transverse location of said longitudinal element of the preceding strip to position the leading end of the first mentioned strip with said longitudinal element thereof in longitudinal alignment with the corresponding longitudinal element of the trailing end of the preceding strip.

6. A method of positioning the leading end of a strip in a continuous strip processing line with a predetermined longitudinal element spaced inwardly of the strip from an edge thereof in longitudinal alignment with the corresponding longitudinal element of the trailing end of the preceding strip for welding the leading end of the first mentioned strip to the trailing end of the preceding strip, comprising by a sensing device sensing the transverse location of said longitudinal element of the trailing end of the preceding strip while the preceding strip is advancing in the continuous strip processing line, by such sensing creating a first signal reflecting transverse movement of the preceding strip, providing transverse positioning means for the leading end of the first mentioned strip, by said first signal transversely shifting the sensing device in accordance with the transverse movement of the preceding strip, by the transverse shifting of the sensing device creating a second signal reflecting such transverse shifting of the sensing device and by said second signal transversely shifting the transverse positioning means in accordance with the transverse shifting of the sensing device to position the leading end of the first mentioned strip with said longitudinal element thereof in longitudinal alignment with the corresponding longitudinal element of the trailing end of the preceding strip.

7. A method of positioning the leading end of a strip in a continuous strip processing line with its longitudinal center line in longitudinal alignment with the longitudinal center line of the trailing end of the preceding strip for welding the leading end of the first mentioned strip to the trailing end of the preceding strip, comprising sensing the transverse location of the center line of the trailing end of the preceding strip and transversely shifting the leading end of the first mentioned strip in accordance with the sensed transverse location of the center line of the preceding strip to position the leading end of the first mentioned strip with its longitudinal center line in longitudinal alignment with the longitudinal center line of the trailing end of the preceding strip.

8. A method of positioning the leading end of a strip in a continuous strip processing line with its longitudinal center line in longitudinal alignment with the longitudinal center line of the trailing end of the preceding strip for welding the leading end of the first mentioned strip to the trailing end of the preceding strip, comprising sensing the transverse location of the center line of the trailing end of the preceding strip while the preceding strip is advancing in the continuous strip processing line, by such sensing creating a signal reflecting transverse movement of the preceding strip and transversely shifting the leading end of the first mentioned strip in accordance with said signal to position the leading end of the first mentioned strip with its longitudinal center line in longitudinal alignment with the longitudinal center line of the trailing end of the preceding strip.

9. Apparatus for positioning the leading end of a strip in a continuous strip processing line with a predetermined longitudinal element spaced inwardly of the strip from an edge thereof in longitudinal alignment with the corresponding longitudinal element of the trailing end of the preceding strip for welding the leading end of the first mentioned strip to the trailing end of the preceding strip, comprising sensing means for sensing the transverse location of said longitudinal element of the trailing end of the preceding strip, positioning means for transversely positioning the leading end of the first mentioned strip, shifting means for transversely shifting the positioning means and connections between the sensing means and the shifting means controlling the transverse shifting of the positioning means in accordance with the sensed transverse location of said longitudinal element of the preceding strip to position the leading end of the first mentioned strip with said longitudinal element thereof in longitudinal alignment with the corresponding longitudinal element of the trailing end of the preceding strip.

10. Apparatus for positioning the leading end of a strip in a continuous strip processing line with a predetermined longitudinal element spaced inwardly of the strip from an edge thereof in longitudinal alignment with the corresponding longitudinal element of the trailing end of the preceding strip for welding the leading end of the first mentioned strip to the trailing end of the preceding strip, comprising sensing means for sensing the transverse location of said longitudinal element of the trailing end of the preceding strip while the preceding strip is advancing in the continuous strip processing line, means connected with the sensing means creating a signal reflecting transverse movement of the preceding strip, positioning means for transversely positioning the leading end of the first mentioned strip, shifting means for transversely shifting the positioning means and means controlled by said signal actuating the shifting means to transversely shift the positioning means in accordance with the sensed transverse location of said longitudinal element of the preceding strip to position the leading end of the first mentioned strip with said longitudinal element thereof in longitudinal alignment with the corresponding longitudinal element of the trailing end of the preceding strip.

11. Apparatus for positioning the leading end of a strip in a continuous strip processing line with a predetermined longitudinal element thereof in longitudinal alignment with the corresponding longitudinal element of the trailing end of the preceding strip for welding the leading end of the first mentioned strip to the trailing end of the preceding strip, comprising sensing means for sensing the transverse location of said longitudinal element of the trailing end of the preceding strip while the preceding strip is advancing in the continuous strip processing line, means connected with the sensing means creating an electric current flow reflecting transverse movement of the preceding strip with the direction of current flow correlated to the direction of transverse movement of the preceding strip, positioning means for transversely positioning the leading end of the first mentioned strip, shifting means for transversely shifting the positioning means and means controlled by said electric current flow actuating the shifting means to transversely shift the positioning means to shift the leading end of the first mentioned strip in one or the other transverse direction depending upon the direction of current flow in accordance with the sensed transverse location of said longitudinal element of the preceding strip to position the leading end of the first mentioned strip with said longitudinal element thereof in longitudinal alignment with the corresponding longitudinal element of the trailing end of the preceding strip.

12. Apparatus for positioning the leading end of a strip in a continuous strip processing line with a predetermined longitudinal element spaced inwardly of the strip from an edge thereof in longitudinal alignment with the corresponding longitudinal element of the trailing end of the preceding strip for welding the leading end of the first mentioned strip to the trailing end of the preceding strip, comprising a sensing device for sensing the transverse location of said longitudinal element of the trailing end of the preceding strip while the preceding strip is advancing in the continuous strip processing line, means connected with the sensing device creating a first signal reflecting transverse movement of the preceding strip, positioning means for transversely positioning the leading end of the first mentioned strip, shifting means for transversely shifting the positioning means, means controlled by said first signal transversely shifting the sensing device in accordance with the transverse movement of the preceding strip, means connected with the sensing device creating a second signal reflecting such transverse shifting of the sensing device and means controlled by said second signal actuating the shifting means to transversely shift the positioning means in accordance with the transverse shifting of the sensing device to position the leading end of the first mentioned strip with said longitudinal element thereof in longitudinal alignment with the corresponding longitudinal element of the trailing end of the preceding strip.

13. Apparatus for positioning the leading end of a strip in a continuous strip processing line with its longitudinal center line in longitudinal alignment with the longitudinal center line of the trailing end of the preceding strip for welding the leading end of the first mentioned strip to the trailing end of the preceding strip, comprising sensing means for sensing the transverse location of the center line of the trailing end of the preceding strip, positioning means for transversely positioning the leading end of the first mentioned strip, shifting means for transversely shifting the positioning and connections between the sensing means and the shifting means controlling the transverse shifting of the positioning means in accordance with the sensed transverse location of the center line of the preceding strip to position the leading end of the first mentioned strip with its longitudinal center line in longitudinal alignment with the longitudinal center line of the trailing end of the preceding strip.

14. Apparatus for positioning the leading end of a strip in a continuous strip processing line with its longitudinal center line in longitudinal alignment with the longitudinal center line of the trailing end of the preceding strip for welding the leading end of the first mentioned strip to the trailing end of the preceding strip, comprising sensing means for sensing the transverse location of the longitudinal center line of the trailing end of the preceding strip while the preceding strip is advancing in the continuous strip processing line, means connected with the sensing means creating a signal reflecting transverse movement of the preceding strip, positioning means for transversely positioning the leading end of the first mentioned strip, shifting means for transversely shifting the positioning means and means controlled by said signal actuating the shifting means to transversely shift the positioning means in accordance with the sensed transverse location of the center line of the preceding strip to position the leading end of the first mentioned strip with its longitudinal center line in longitudinal alignment with the longitudinal center line of the trailing end of the preceding strip.

15. Apparatus for positioning the leading end of a strip in a continuous strip processing line with a predetermined longitudinal element spaced inwardly of the strip from an edge thereof in longitudinal alignment with the corresponding longitudinal element of the trailing end of the preceding strip for welding the leading end of the first mentioned strip to the trailing end of the preceding strip, comprising sensing means for sensing the transverse location of said longitudinal element of the trailing end of the preceding strip while the preceding strip is advancing in the continuous strip processing line, means connected with the sensing means creating a signal reflecting transverse movement of the preceding strip, positioning means for transversely positioning the leading end of the first mentioned strip, shifting means for transversely shifting the positioning means, the shifting means including an electro-hydraulic controller, and means controlled by said signal actuating the electro-hydraulic controller to transversely shift the positioning means in accordance with the sensed transverse location of said longitudinal element of the preceding strip to position the leading end of the first mentioned strip with said longitudinal element thereof in longitudinal alignment with the corresponding longitudinal element of the trailing end of the preceding strip.

16. Apparatus for positioning the leading end of a strip in a continuous strip processing line with a predetermined longitudinal element spaced inwardly of the strip from an edge thereof in longitudinal alignment with the corresponding longitudinal element of the trailing end of the preceding strip for welding the leading end of the first mentioned strip to the trailing end of the preceding strip, comprising a sensing device for sensing the transverse location of said longitudinal element of the trailing end of the preceding strip while the preceding strip is advancing in the continuous strip processing line, means connected with the sensing device creating a first signal reflecting transverse movement of the preceding strip, positioning means for transversely positioning the leading end of the first mentioned strip, shifting means for transversely shifting the positioning means, means including an electro-hydraulic controller and a hydraulic cylinder actuated thereby controlled by said first signal transversely shifting the sensing device in accordance with the transverse movement of the preceding strip, means connected with the sensing device creating a second signal reflecting such transverse shifting of the sensing device and means controlled by said second signal actuating the shifting means to transversely shift the positioning means in accordance with the transverse shifting of the sensing device to position the leading end of the first mentioned strip with said longitudinal element thereof in longitudinal alignment with the corresponding longitudinal element of the trailing end of the preceding strip.

17. Apparatus for positioning the leading end of a strip in a continuous strip processing line with a predetermined longitudinal element spaced inwardly of the strip from an edge thereof in longitudinal alignment with the corresponding longitudinal element of the trailing end of the preceding strip for welding the leading end of the first mentioned strip to the trailing end of the preceding srtip, comprising a sensing device for sensing the transverse location of said longitudinal element of the trailing end of the preceding strip while the preceding strip is advancing in the continuous strip processing line, means connected with the sensing device creating a first signal reflecting transverse movement of the preceding strip, positioning means for transversely positioning the leading end of the first mentioned strip, shifting means for transversely shifting the positioning means, means controlled by said first signal transversely shifting the sensing device in accordance with the transverse movement of the preceding strip, means connected with the sensing device creating a second signal reflecting such transverse shifting of the sensing device and means including an electro-hydraulic controller and a hydraulic cylinder controlled by said second signal actuating the shifting means to transversely shift the positioning means in accordance with the transverse shifting of the sensing device to position the leading end of the first mentioned strip with said longitudinal element thereof in longitudinal alignment with the corresponding longitudinal element of the trailing end of the preceding strip.

18. Apparatus for positioning the leading end of a strip in a continuous strip processing line with a predetermined longitudinal element spaced inwardly of the strip from an edge thereof in longitudinal alignment with the corresponding longitudinal element of the trailing end of the preceding strip for welding the leading end of the first mentioned strip to the trailing end of the preceding strip, comprising a sensing device for sensing the transverse location of said longitudinal element of the trailing end of the preceding strip while the preceding strip is advancing in the continuous strip processing line, means connected with the sensing device creating a first signal reflecting transverse movement of the preceding strip, positioning means for transversely positioning the leading end of the first mentioned strip, shifting means for transversely shifting the positioning means, means including an electro-hydraulic controller and a hydraulic cylinder actuated thereby controlled by said first signal transversely shifting the sensing device in accordance with the transverse movement of the preceding strip, means connected with the sensing device creating a second signal reflecting such transverse shifting of the sensing device and means including an electro-hydraulic controller and a hydraulic cylinder actuated thereby controlled by said second signal actuating the shifting means to transversely shift the positioning means in accordance with the transverse shifting of the sensing device to position the leading end of the first mentioned strip with said longitudinal element thereof in longitudinal alignment with the corresponding longitudinal element of the trailing end of the preceding strip.

19. Apparatus for positioning the leading end of a strip in a continuous strip processing line with a predetermined longitudinal element thereof in longitudinal alignment with the corresponding longitudinal element of the trailing end of the preceding strip for welding the leading end of the first mentioned strip to the trailing end of the preceding strip, comprising sensing elements disposed respectively at the side edges of the trailing end of the preceding strip for sensing the transverse location of said longitudinal element thereof while the preceding strip is advancing in the continuous strip processing line, means for transversely shifting the sensing elements toward and away from each other in accordance with changes in width of the trailing end of the preceding strip, means connected with the sensing elements creating a signal reflecting transverse movement of the preceding strip, positioning means for transversely positioning the leading end of the first mentioned strip, shifting means for transversely shifting the positioning means and means controlled by said signal actuating the shifting means to transversely shift the positioning means in accordance with the sensed transverse location of said longitudinal element of the preceding strip to position the leading end of the first mentioned strip with said longitudinal element thereof in longitudinal alignment with the corresponding longitudinal element of the trailing end of the preceding strip.

20. Apparatus for positioning the leading end of a strip in a continuous strip processing line with its longitudinal center line in longitudinal alignment with the longitudinal center line of the trailing end of the preceding strip for welding the leading end of the first mentioned strip to the trailing end of the preceding strip, comprising a sensing device including sensing elements disposed respectively at the side edges of the trailing end of the preceding strip for sensing the transverse location of the longitudinal center line thereof while the preceding strip is advancing in the continuous strip processing line, means for transversely shifting the sensing elements toward and away from each other in accordance with changes in width of the trailing end of the preceding strip, means connected with the sensing device creating a first signal reflecting transverse movement of the preceding strip, positioning means for transversely positioning the leading end of the first mentioned strip, shifting means for transversely shifting the positioning means, means including an electro-hydraulic controller and a hydraulic cylinder actuated thereby controlled by said first signal transversely shifting the sensing device in accordance with the transverse movement of the preceding strip, means connected with the sensing device creating a second signal reflecting such transverse shifting of the sensing device and means including an electro-hydraulic controller and a hydraulic cylinder actuated thereby controlled by said second signal actuating the shifting means to transversely shift the positioning means in accordance with the transverse shifting of the sensing device to position the leading end of the first mentioned strip with its longitudinal center line in longitudinal alignment with the longitudinal center line of the trailing end of the preceding strip.

References Cited
UNITED STATES PATENTS

| | | | |
|---|---|---|---|
| 2,810,316 | 10/1957 | Snyder | 250—219 |
| 2,827,809 | 3/1958 | Beam | 228—4 |
| 2,883,559 | 4/1959 | Bailey | 250—219 |
| 2,931,917 | 4/1960 | Beelitz | 250—219 |
| 3,090,534 | 5/1963 | Frommer et al. | 250—219 |
| 3,096,919 | 7/1963 | Snyder | 250—219 |
| 3,247,354 | 4/1966 | Mallett et al. | 219—82 |
| 3,256,419 | 6/1966 | Taylor et al. | 219—82 |

RICHARD H. EANES, JR., *Primary Examiner.*

JOHN F. CAMPBELL, M. L. FAIGUS,
*Assistant Examiners.*